(12) United States Patent
Mehta et al.

(10) Patent No.: US 10,409,843 B1
(45) Date of Patent: Sep. 10, 2019

(54) DETECTING AN EVENT FROM SIGNALS IN A LISTENING AREA

(71) Applicant: Banjo, Inc., Park City, UT (US)

(72) Inventors: Rish Mehta, Redwood City, CA (US); Damien Patton, Park City, UT (US); Christian Gratton, Las Vegas, NV (US); K W Justin Leung, Redwood City, CA (US); Varun Gowda, Park City, UT (US)

(73) Assignee: BANJO, INC., Park City, UT (US)

( * ) Notice: Subject to any disclaimer, the term of this patent is extended or adjusted under 35 U.S.C. 154(b) by 0 days.

(21) Appl. No.: 16/423,551

(22) Filed: May 28, 2019

Related U.S. Application Data

(63) Continuation of application No. 16/131,637, filed on Sep. 14, 2018.

(60) Provisional application No. 62/663,264, filed on Apr. 27, 2018, provisional application No. 62/664,001, filed on Apr. 27, 2018, provisional application No. 62/664,004, filed on Apr. 27, 2018, provisional application No. 62/667,616, filed on May 7, 2018, provisional application No. 62/668,820, filed on May 9, 2018, provisional application No. 62/669,961, filed on May 10, 2018, provisional application No. 62/669,583, filed on May 10, 2018, provisional application No. 62/686,791, filed on Jun. 19, 2018.

(51) Int. Cl.
| | | |
|---|---|---|
| G06F 17/27 | (2006.01) | |
| G06F 16/332 | (2019.01) | |
| G06F 16/29 | (2019.01) | |
| G06F 16/9537 | (2019.01) | |
| G06Q 10/06 | (2012.01) | |
| H04L 29/08 | (2006.01) | |
| H04W 76/50 | (2018.01) | |
| G06F 16/583 | (2019.01) | |
| G06F 17/21 | (2006.01) | |
| G06F 16/38 | (2019.01) | |

(52) U.S. Cl.
CPC .......... *G06F 16/3329* (2019.01); *G06F 16/29* (2019.01); *G06F 16/5846* (2019.01); *G06F 16/9537* (2019.01); *G06Q 10/06* (2013.01); *H04L 67/12* (2013.01); *H04W 76/50* (2018.02); *G06F 16/381* (2019.01)

(58) Field of Classification Search
CPC ............ G06F 16/3329; G06F 16/5846; G06F 16/9537; G06F 16/29; G06F 16/381; H04W 76/50; H04L 67/12; G06Q 10/06
USPC .................................................... 704/9
See application file for complete search history.

*Primary Examiner* — Thierry L Pham
(74) *Attorney, Agent, or Firm* — Michael B. Dodd; R. Jace Hirschi

(57) ABSTRACT

The present invention extends to methods, systems, and computer program products for detecting an event. A listening area is monitored based on detecting a potential event from a normalized signal, based on characteristics of a normalized signal, or based on a signal pattern anomaly. A geo cell database is queried with search terms derived from one or more normalized signals. A geo cell subset is returned from the geo cell database. The listening area is formed from the geo cells included in the geo cell subset and monitored for additional signals. An event is detected and/or validated (or rejected) based on the additional normalized signal.

20 Claims, 12 Drawing Sheets

US 10,409,843 B1

DETECTING AN EVENT FROM SIGNALS IN A LISTENING AREA

CROSS-REFERENCE TO RELATED APPLICATIONS

This application is a continuation of U.S. patent application Ser. No. 16/131,637, entitled "Detecting An Event From Signals In A Listening Area", filed Sep. 14, 2018, which is incorporated herein in its entirety. That application claims the benefit of U.S. Provisional Patent Application Ser. No. 62/663,264, entitled "Validating An Event From Signals In a Listening Area", filed Apr. 27, 2018, which is incorporated herein in its entirety. That application claims the benefit of U.S. Provisional Patent Application Ser. No. 62/664,001, entitled "Normalizing Different Types Of Ingested Signals Into A Common Format", filed Apr. 27, 2018 which is incorporated herein in its entirety. That application claims the benefit of U.S. Provisional Patent Application Ser. No. 62/664,004, entitled "Adjusting A Listening Area Based On Detected Signals", filed Apr. 27, 2018, which is incorporated herein in its entirety. That application claims the benefit of U.S. Provisional Patent Application Ser. No. 62/667,616, entitled "Normalizing Different Types Of Ingested Signals Into A Common Format", filed May 7, 2018 which is incorporated herein in its entirety. That application claims the benefit of U.S. Provisional Patent Application Ser. No. 62/668,820, entitled "Validating An Event From Signals In a Listening Area", filed May 9, 2018, which is incorporated herein in its entirety. That application claims the benefit of U.S. Provisional Patent Application Ser. No. 62/669,961 entitled "Triggering A Listening Area From Single Signal Content", filed May 10, 2018, which is incorporated herein in its entirety. That application claims the benefit of U.S. Provisional Patent Application Ser. No. 62/669,583, entitled, "Triggering A Listening Area From Anomalies In Signal Patterns", filed May 10, 2018, which is incorporated herein in its entirety.

This application claims the benefit of U.S. Provisional Patent Application Ser. No. 62/686,791 entitled, "Normalizing Signals", filed Jun. 19, 2018 which is incorporated herein in its entirety.

BACKGROUND

1. Background and Relevant Art

Entities (e.g., parents, guardians, friends, relatives, teachers, social workers, first responders, hospitals, delivery services, media outlets, government entities, etc.) may desire to be made aware of relevant events (e.g., fires, accidents, police presence, shootings, etc.) as close as possible to the events' occurrence. However, entities typically are not made aware of an event until after a person observes the event (or the event aftermath) and calls authorities.

In general, techniques that attempt to automate event detection are unreliable. Some techniques have attempted to mine social media data to detect the planning of events and forecast when events might occur. However, events can occur without prior planning and/or may not be detectable using social media data. Further, these techniques are not capable of meaningfully processing available data nor are these techniques capable of differentiating false data (e.g., hoax social media posts).

Other techniques use textual comparisons to compare textual content (e.g., keywords) in a data stream to event templates in a database. If text in a data stream matches keywords in an event template, the data stream is labeled as indicating an event.

Event relevance can also depend at least in part on location. For example, the Atlanta, Ga. fire department has no interest in a fire in Denver, Colo.

BRIEF SUMMARY

Examples extend to methods, systems, and computer program products for detecting an event.

In one aspect, a normalized signal is received. The normalized signal can include a time dimension, a location dimension, a context dimension, and content. A potential event is detected based on characteristics of the normalized signal and first detection model thresholds. Search terms are derived from content of the normalized signal. A geo cell database is queried with the search terms. A list of geo cells that correspond to the search terms is received from the geo cell database.

A geo cell listening area is formulated from the list of geo cells. An additional normalized signal is monitored in the geo cell listening area that satisfies second detection model thresholds that are less stringent than the first detection model thresholds. The additional normalized signal can include another time dimension, another location dimension, another context dimension, and other content. The potential event is validated as an actual event based on characteristics of the additional signal.

In another aspect, a normalized signal is received. The normalized signal can include a time dimension, a location dimension, a context dimension, and content. Formation of a listening area is triggered based on characteristics of the normalized signal. Search terms are derived from content of the normalized signal. A geo cell database is queried with the search terms. A list of geo cells that correspond to the search terms is received from the geo cell database.

A geo cell listening area is formulated from the list of geo cells. An additional normalized signal is monitored in the geo cell listening area that satisfies detection model thresholds. The additional normalized signal can include another time dimension, another location dimension, another context dimension, and other content. An event is detected based on the characteristics of the normalized signal and characteristics of the additional normalized signal.

In a further aspect, a signal pattern is computed from characteristics of a plurality of normalized signals. Each of the plurality of normalized signals can include a time dimension, a location dimension, a context dimension, and content. A historical signal pattern is accessed from a geo cell database. The computed signal pattern is compared to the historical signal pattern. A signal pattern anomaly is identified based on the comparison.

Formation of a listening area is trigger based on the signal pattern anomaly. Search terms are derived from content of the normalized signal. A geo cell database is queried with the search terms. A list of geo cells that correspond to the search terms is received from the geo cell database.

A geo cell listening area is formulated from the list of geo cells. An additional normalized signal is monitored in the geo cell listening area that satisfies detection model thresholds. The additional normalized signal can include another time dimension, another location dimension, another context dimension, and other content. An event is detected based on the characteristics of the computed signal pattern and characteristics of the additional normalized signal.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
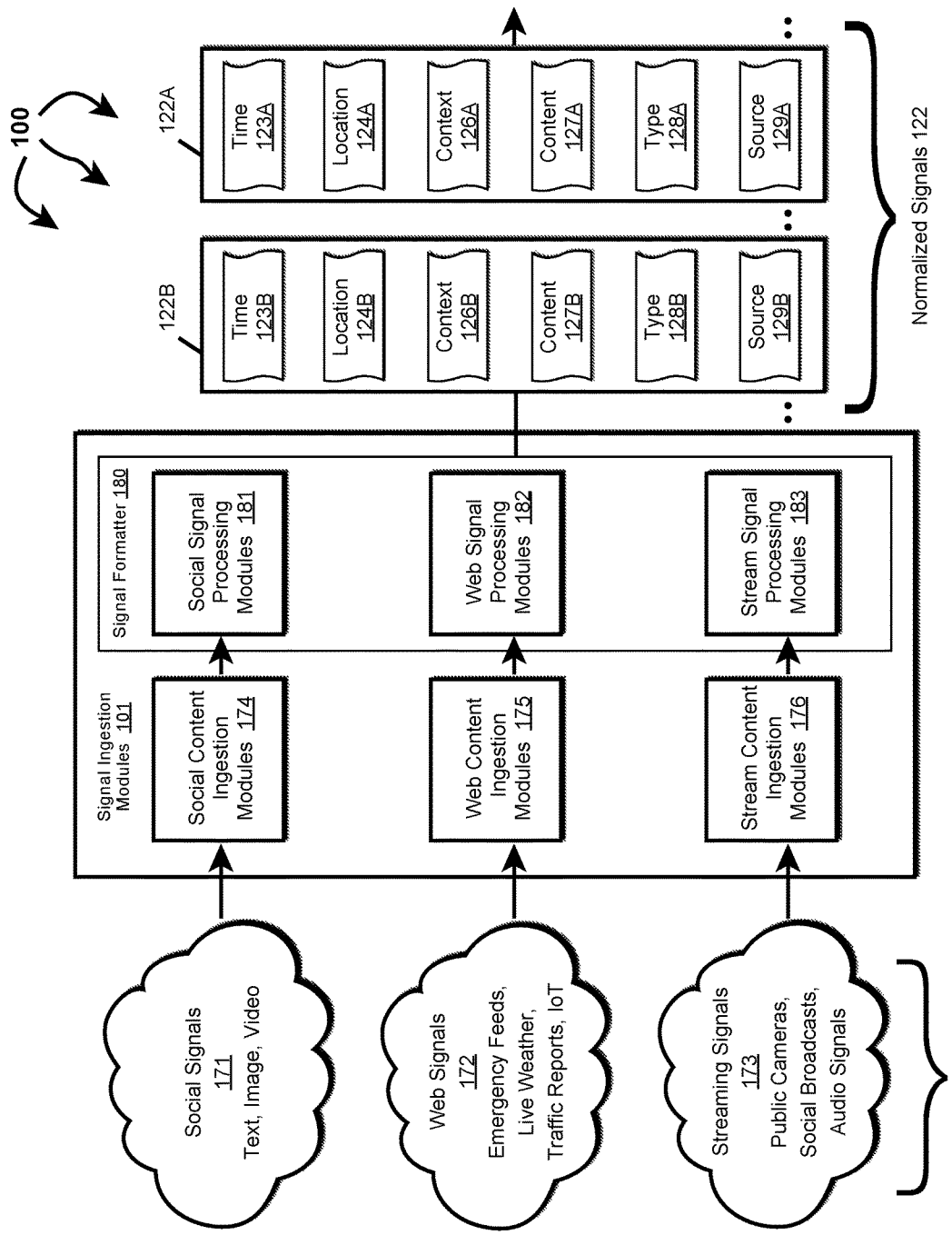
FIG. 1A illustrates an example computer architecture that facilitates normalizing ingesting signals.
Figure 1B:
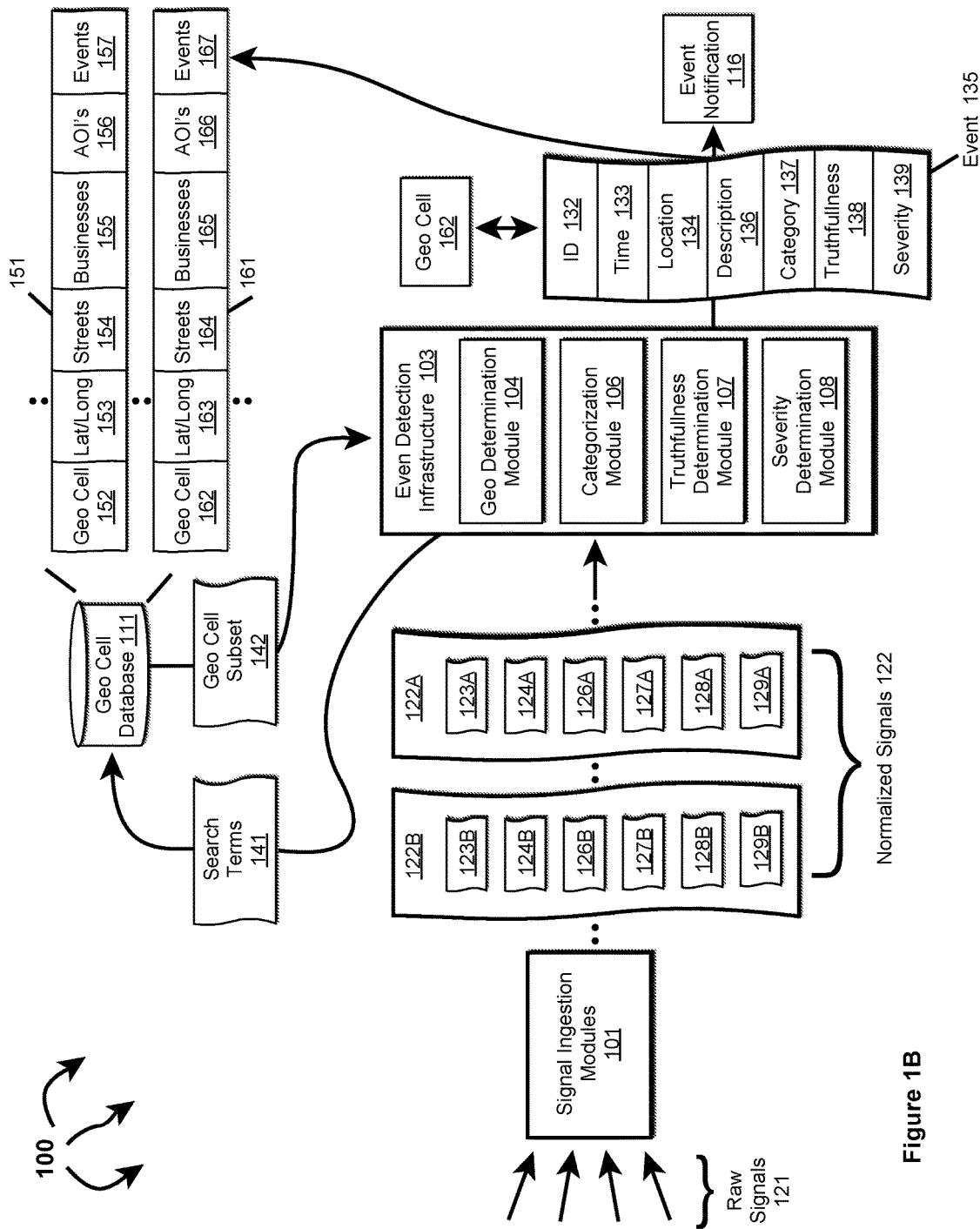
FIG. 1B illustrates an example computer architecture that facilitates detecting events from normalized signals.

Examples extend to methods, systems, and computer program products for detecting an event from signals in a listening area.

In general, signal ingestion modules ingest a variety of raw structured and/or raw unstructured signals on an ongoing basis. Raw signals can originate from different sources, including social posts, traffic camera feeds, other camera feeds (e.g., from other public cameras or from CCTV cameras), listening device feeds, 911 calls, weather data, planned events, IoT device data, smart city sensor data, crowd sourced traffic and road information, satellite data, air quality sensor data, public radio communication (e.g., among first responders and/or dispatchers, between air traffic controllers and pilots), etc. Raw signals can include different data media types and different data formats, including Web signals. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a raw signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingested raw signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

The signal ingestion modules can send normalized signals to an event detection infrastructure, a signal cache, and a listener.

The signal cache can cache normalized signals for a specified period of time, after which the signals are removed from the signal cache. In one aspect, signals are cached in the signal cache for up to an hour.

Concurrently with signal ingestion, the event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Features of normalized signals can include: signal type, signal source, signal content, Time (T) dimension, Location (L) dimension, Context (C) dimension, other circumstances of signal creation, etc.

In one aspect, the event detection infrastructure detects potential events of interest to one or more entities on an ongoing basis (and also essentially in real-time). A potential event can be detected when characteristics of one or more signals satisfy first detection model thresholds. In one aspect, there is a first detection model threshold per content type. For example, there can be a first detection model threshold for image content types, audio content types, text content types, etc. First detection model thresholds can also correspond to a type of processing performed on content, such as, for example, image processing (e.g., optical character recognition (OCR)), audio processing (e.g., transcription), NLP (e.g., recognizing named entities in text), etc.

Signal characteristics can include Time dimension, Location dimension, Context dimension, signal type, signal creator, content, other circumstances of signal creation, etc. Detected potential events can be categorized into different categories, such as, for example, fire, police response, mass shooting, traffic accident, natural disaster, storm, active shooter, concerts, protests, etc. Potential events can be detected from a single signal or can be detected from multiple signals. The event detection infrastructure can trigger formulation of a listening area in response to detecting a potential event.

In another aspect, signal ingestion modules also send normalized signals to a trigger module. The trigger module monitors the normalized signals. Based on signal characteristics of one or more normalized signals, the trigger module can trigger formulation of a listening area.

In a further aspect, the event detection infrastructure also includes a signal pattern maintenance module. The signal pattern maintenance module monitors normalized signals per geo cell. The signal pattern maintenance module formulates and maintains one or more signal patterns per geo cell based on characteristics of normalized signals (e.g., signal volume, signal type, signal content, etc.) ingested in a geographic area defined by the geo cell.

Signal patterns can vary per geo cell context, for example, by time of day, time of year, day of week, season, etc. As such, the signal pattern maintenance module can formulate and maintain an indication of "normal" signal patterns for a geo cell across a variety of different geo cell contexts (e.g., times, days, seasons, etc.) Signal patterns can be stored in a corresponding geo cell entry in the geo cell database. A "normal" signal pattern can indicate typical signal characteristics of normalized signals in a geo cell context.

Per geo cell context, as new normalized signals are monitored in a geo cell, an appropriate existing "normal" signal pattern (e.g., the "normal" signal pattern corresponding to the geo cell context) can be accessed from the geo cell database. The signal pattern maintenance module can reformulate a new "normal" signal pattern for the geo cell context by integrating the new normalized signals into the existing "normal" signal pattern.

In general, the trigger module can be aware of "normal" signal patterns (e.g., signal volume, signal type, signal content, etc.) in geo cell contexts. When the trigger module detects a signal pattern "anomaly", the trigger module can trigger formation of a listening area.

The trigger module can monitor normalized signals. For a geo cell context, the trigger module can detect signal patterns in received normalized signals for defined periods of time (e.g., every minute, every five minutes, every 30 minutes, etc.). The trigger module can access a "normal" signal pattern for the geo cell context from the geo cell database. The trigger module can compare a detected signal pattern to the "normal" signal pattern. When a detected signal pattern differs from a "normal" signal pattern by more than a specified threshold, the detected signal pattern can be considered an "anomaly" and possibly indicative of an event in the geo cell. In response to detecting a signal pattern anomaly, the trigger module can trigger formation of a listening area.

The event detection infrastructure includes a geo determination module. For each of one or more signals used to detect a potential event, used to otherwise trigger a listening area, or associated within a signal pattern anomaly, the geo determination module can derive search terms from the signal characteristics. The geo determination module can derive search terms from a Location dimension of a normalized signal. The geo determination module can also include modules for deriving search terms from different kinds of signal content including text, images, audio, and video. For example, the geo determination module can include image processing modules (e.g., optical character recognition (OCR)), audio processing modules (e.g., transcription), video processing modules, text analysis modules, natural language processing modules, etc.

A geo cell database (or other storage mechanism) stores a number of geo cell entries. Each geo cell entry includes a geo cell along with corresponding indications of things included within a geographic area defined by the geo cell. For example, each geo cell entry can include a geo cell and one or more other types of supplemental information, including: corresponding latitude/longitude, street names located in an area defined by the geo cell, business names in the area defined by the geo cell, school names in the area defined by the geo cell, park names in the area defined by the geo cell, names of other public facilities in the area defined by the geo cell (e.g., monuments), names for other Areas of Interest (AOIs), image fingerprints derived from images captured in the area defined by the geo cell, etc.

The geo determination module can query the geo cell database with search terms formulated from signal characteristics. The geo cell database can match the search terms to supplemental information associated with a geo cell. For example, if a search term includes location information derived from a Location dimension, such as, a geo cell identifier, lat/lon, etc., the geo cell database can match the location information to a geo cell. As another example, if a search term includes a street name any geo cells including the street name in supplemental information can be matched to the search term. The geo cell database can return subset of one or more geo cells having matched supplemental data to the listener.

Generally, the listener listens for additional signals in a geographic area defined by each of the subset of geo cells (and possibly other areas defined by adjacent and/or nearby geo cells). If additional related signals are detected, the listener sends the additional related signals to the event detection infrastructure.

The listener can be configured to listen to a listening area for a specified time period. If no additional related signal is detected within the specified time period, the listening area expires. On the other hand, when an additional related signal is detected within the specified time period, the specified time period can be reset or extended.

Different distances may be relevant for different event categories. For example, at a specified geo cell precision, accidents might only have content in the nearest neighbor geo cells, but fires could have content many geo cells away because people are taking pictures of the smoke. Thus, different distance thresholds can be used for different event categories. The listener can determine which adjacent and/or nearby geo cells to consider based on distance thresholds per event category. Accordingly, when a detection comes in, the listener knows how far to expand a "geo" search area for additional content.

The listener can identify a signal as a related signal when the signal has characteristics satisfying second detection thresholds. There can be a second detection threshold per content type. For example, there can be a second detection model threshold for image content types, audio content types, text content types, etc. Second detection model thresholds can also correspond to a type of processing performed on content, such as, for example, image processing, audio processing, NLP, etc.

Second detection model thresholds can be set (possibly significantly) lower than first detection model thresholds. Thus, an increased number of signals within a listening area can identified as related. In one aspect, second detection model thresholds are set to essentially zero. As such, virtually all signals in the listening area are identified as related.

The listener can also refer to signals in the signal cache. The listener can consider any signals received within a specified period of time prior to formation of a listening area. For example, the listener can consider any signals received within 15 minutes prior to detection. Thus, the listener can refer to cached signals in combination with use of lower second detection model thresholds. Accordingly, the listener can consider signals that may be related but did not trigger listening area formation when initially received.

In one aspect, a second detection threshold specifies a requisite similarity between Context dimensions of one or more triggering signals and one or more additional signals detected in a listening area. When a Context dimension of a detected signal has the requisite similarity to the Context dimension of a triggering signal, the detected signal is identified as related to the triggering signal.

The listener can send any identified related signals to the event detection infrastructure. The event detection infrastructure can use any identified related signals to detect an event, validate a potential event as an actual event, or invalidate a potential event.

The event detection infrastructure can use the listener and a listening area to hone in on more relevant signals and ignore less relevant signals. As such, resources are not wasted attempting to detect events from less (or even non) relevant signals.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, search terms, geo cell subsets, potential events, events, geo cells, geo cell entries, cached signals, detection thresholds, signals patterns, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, search terms, geo cell subsets, potential events, events, geo cells, geo cell entries, cached signals, detection thresholds, signals patterns, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and is corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geo Cell Precisions

| geo cell Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Additionally or alternatively, geo cell geometries can include hexagonal tiling, triangular tiling, and/or any other suitable geometric shape tiling. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a raw signal. Time, Location, and Context dimensions for a raw signal can be extracted/derived/inferred from metadata, characteristics of the raw signal, characteristics of other raw signals, characteristics of previously detected events, etc.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested raw signal includes sufficient expressly defined time, location, and context information upon ingestion. The expressly defined time, location, and context information is used to determine Time, Location, and Context dimensions for the ingested raw signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources. Other data sources can include additional raw signals and previously detected events.

In additional aspects, time information may not be included, or included time information may not be given with high enough precision and Time dimension is inferred.

For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

In general, a raw signal can include various characteristics including one or more of: a time stamp, location information (e.g., lat/lon, GPS coordinates, etc.), context information (e.g., text expressly indicating a type of event), a signal type (e.g., social media, 911 communication, traffic camera feed, etc.), a signal source (e.g., Facebook, twitter, Waze, etc.), and content (e.g., one or more of: image, video, text, keyword, locale, etc.). Streaming signals 173 can include live video and/or non-live (previously stored) video.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 176 and web signal processing module 182 can interoperate to normalize web signals 172 into TLC dimensions. Likewise, stream content ingestion modules 177 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity and resource consumption of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Event Detection

FIGS. 1B, 2A, 2B, and 2C depict part of computer architecture 100 that facilitates detecting events. As depicted, computer architecture 100 can further include event detection infrastructure 103, geo cell database 111, event notification 116, listener 212, signal cache 213, and trigger module 231. Event detection infrastructure 103, geo cell database 111, event notification 116, listener 212, signal cache 213, and trigger module 231 can be connected to (or be part of) a network with signal ingestion modules 101 and event detection infrastructure 103. As such, event detection infrastructure 103, geo cell database 111, event notification 116, listener 212, signal cache 213, and trigger module 231 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner. Handling signals in a more uniform manner increases event detection and event change detection efficiency and effectiveness and also reduces resource consumption. For example, Time, Location, and Context vectors of different normalized signals can be compared (instead of comparing along numerous, and differing and/or non-uniform, other dimensions).

Event detection infrastructure 103 can also determine an event truthfulness, event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field). Sufficiently precise geo cells can be used to increase the practicality of storing matching content.

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162). As such, geo cell database can store an event history per cell. Other modules can refer to the event history when appropriate.

Event detection infrastructure 103 can also send event 135 to event notification module 116. Event notification module 116 can notify one or more entities about event 135.

Detecting an Event from Signals in a Listening Area

Figure 2A:
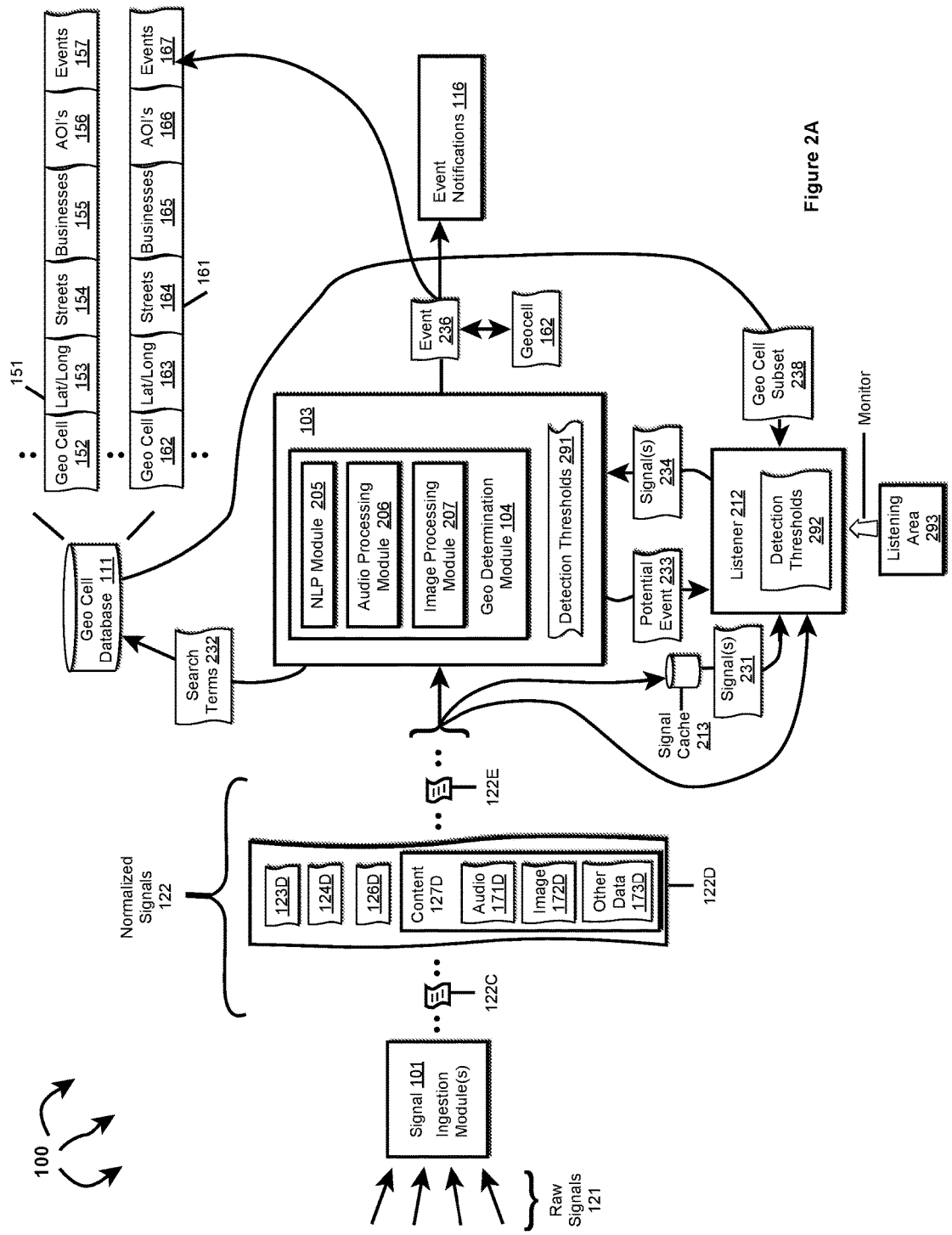
FIG. 2A illustrates an example computer architecture that facilitates detecting an event from signals in a listening area.

FIG. 2A illustrates a further view of computer architecture 100. The components in FIG. 2A can be used to detect an event from signals in a listening area. Signal ingestion modules 101 can send normalized signals 122 to event detection infrastructure 103, listener 212, and signal cache 213.

Listener 212 can form a listening area corresponding to a geographic area associated with one or more geo cells in a geo cell subset. The geographic area can include the geographic area defined by one or more geo cells in the geo cell subset and possibly other areas defined by adjacent and/or nearby geo cells. Different distances may be relevant for different event categories. For example, accidents might only have content in the nearest neighbor geo cells, but fires could have content many geo cells away because people are taking pictures of the smoke. As such, in one aspect, different distance thresholds are used for different event categories of a potential event. Listener 212 can determine which adjacent and/or nearby geo cells to consider based on distance thresholds per event category. Thus, when creation of a listening area is triggered, listener 212 knows how far to expand a "geo" search area for additional signals.

In general, geo determination module 104 includes one or more recognition modules configured to recognize named entities from signal characteristics of normalized signals. Named entities can be recognized from text, from images, from audio, from video, etc. Different recognition modules can interoperate to recognize named entities. As depicted in FIG. 2A, geo determination module 104 includes NLP module 205, audio processing module 206, and image processing module 207.

Event detection infrastructure 103 can detect a potential event based on the characteristics of one or more normalized signals satisfying first detection thresholds. Event detection infrastructure can send the potential event to listener 212. In response to detecting the potential event, event detection infrastructure 103 can also trigger formation of a listening area.

Characteristics of (e.g., dimensions of, content in, etc.) the one or more normalized signals can be processed to identify search terms. Text content included in a normalized signal can be sent to NLP module 205. NLP module 205 can recognize named entities included in text content. The named entities can be used as search terms when querying geo cell database.

Image processing module 207 can (e.g., using optical character recognition (OCR)) recognize characters included in images. Image content included in a normalized signal can be sent to image processing module 207. Image processing module 207 can recognize characters in the image content and convert the recognized characters into additional text. NLP modules 205 can identify search terms (e.g., named entities) included in the additional text. Image processing module 207 can also be configured to generate an image fingerprint of an image.

Audio processing module 206 is configured to transcribe audio into text. Audio content included in a normalized signal can be sent to audio analysis module 206. Audio processing module 206 can transcribe the audio content into further text. NLP modules 205 can identify search terms (e.g., named entities) included in the further text.

Search terms (named entities) can include street addresses, building names, landmark names, location names, school names, AOIs, image fingerprints, etc. Event detection infrastructure 103 can submit search terms to geo cell database 111. Geo cell database 111 can identifying one or more geo cells that contain the search terms (or a subset thereof). Geo cell data base can return a subset of geo cells containing the search terms to listener 212.

Listener 212 can form a listening area based on the subset of geo cells. Listener 212 can listen for additional normalized signals related to the potential event in the listening area. A related normalized signal can be a normalized signal that satisfies second detection thresholds. In one aspect, second detection thresholds define a requisite similarity between the context dimension of a normalized signal in the listening area and the context dimensions of one of more normalized signals used to detect a potential event (thresholds defining requisite similarities between time dimensions and/or location dimensions are also contemplated). Second detection threshold holds can be lower (i.e., less stringent) than first detection thresholds. If requisite similarly is present, the normalized signal in the listening area is indicated as a normalized signal related to a potential event. Listener 212 can send related normalized signals back to event detection infrastructure 103. Event detection infrastructure 103 can validate the potential event as an actual event based on characteristics of related normalized signals.

Listener 212 can also listen for specific invalidating signals. For example, a potential event can indicate a snow storm in a location. However, an additional signal confirming the temperature at the location is 85 degrees F. can invalidate the potential event. Similar invalidating signals can be used when a potential event is indicated as occurring during night or during day, but additional signals confirm the opposite. Listener 2112 can send invalidating signals back to event detection infrastructure 103.

Signal cache 213 can store normalized signals for a specified amount of time (e.g., up to one hour) after which normalized signals are removed from signal cache 213. Listener 212 can refer to normalized signals in signal cache 213 to check for historical normalized signals related to a potential event. Listener 212 can consider any signals in signal cache 213 received with a specified time period prior to detection of a potential event (e.g., within 15 minutes prior to detection). Referring to cached signals in combination with use of lower second detection model thresholds, permits listener 212 to consider signals that may be related to a potential event but did not satisfy first detection model thresholds when initially received.

Figure 3:
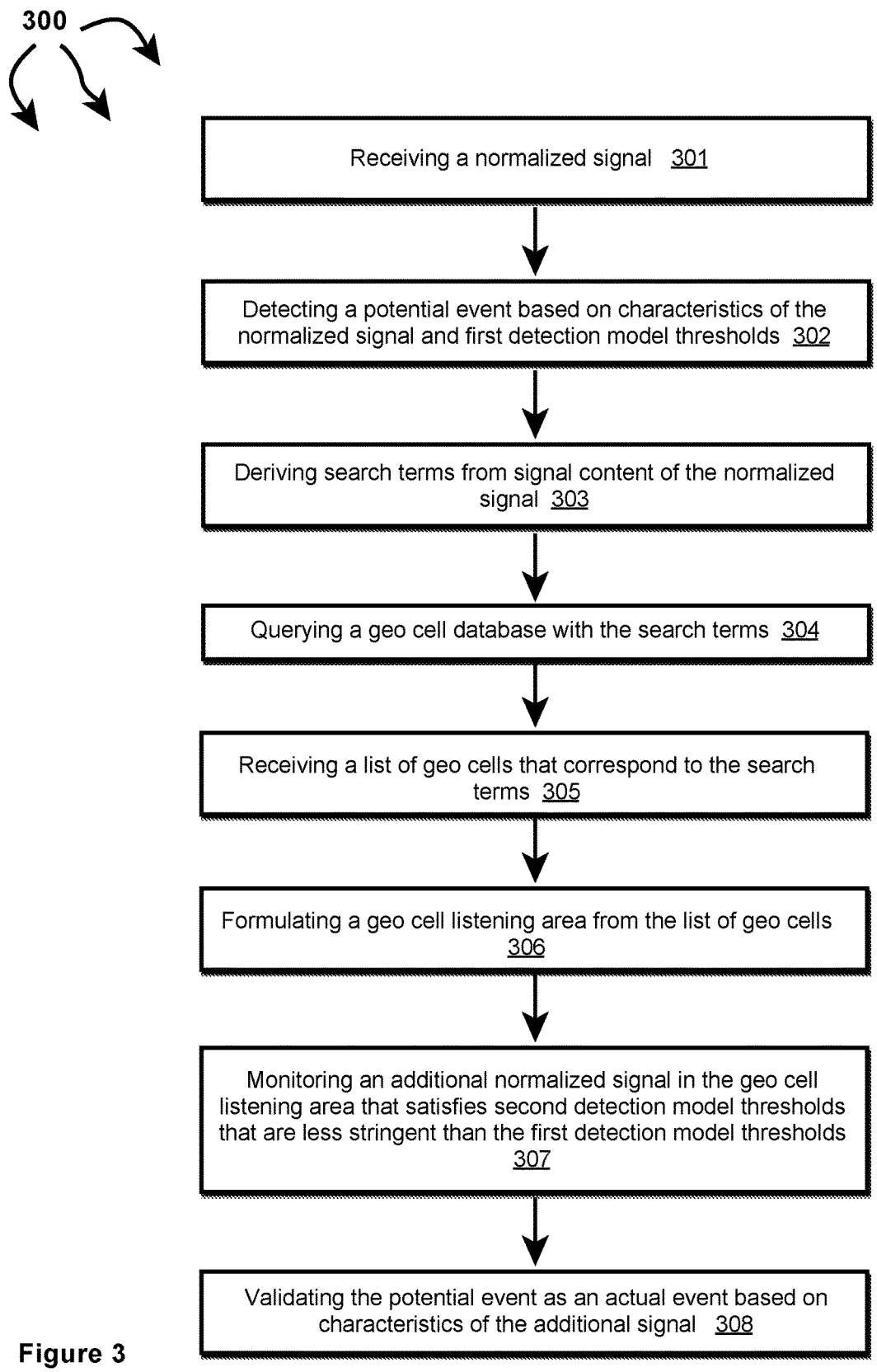
FIG. 3 illustrates a flow chart of an example method for detecting an event from signals in a listening area.

FIG. 3 illustrates a flow chart of an example method 300 for detecting an event from signals in a listening area. Method 300 will be described with respect to the components and data in FIG. 2A.

Method 300 includes receiving a normalized signal (301). For example, event detection infrastructure can receive normalized signal 122D from signal ingestion module(s) 101. As depicted, normalized signal 122D includes time dimension 123D, location dimension 124D, context dimension 126D, content 127D, a signal type, and a signal source. Content 127D further includes audio 171D, image 172D, and other data 173D. Method 300 includes detecting a potential event based on characteristics of the normalized signal and first detection model thresholds (302). For example, event detection infrastructure 103 can detect potential event 233 based characteristics of normalized signal 122D and detection thresholds 291. Characteristics of normalized signal 122D include time dimension 123D, location dimension 124D, context dimension 126D, content 127D, the signal type, and the signal source.

Event detection infrastructure 103 can include one or more probability models per event. Event detection infrastructure 103 can use the one or more probability models to compute a probability that the characteristics of normalized signal 122D indicate a specified event type. A computed probability can be compared to a detection threshold 291 for the specified type of event. When the computed probability satisfies (e.g., exceeds) the probability threshold, event detection infrastructure 103 detects potential event 233.

Method 300 includes deriving search terms from signal content of the normalized signal (303). For example, geo determination module 104 can derive (e.g., location) search terms 232 from one or more of: audio 171D, image 172D, and other data 173D. More specifically, image analysis module 207 can (e.g., using OCR) recognize characters included image 172D. Image analysis modules 207 can convert the recognized characters into text. Similarly, audio analysis module 206 can transcribe audio 171D into text. Other processing modules, for example, video processing modules, can convert other data 173D to text or recognize text included in other data 173D. NLP module 205 can derive search terms 232 from any text. Search terms 232 can include street addresses, building names, landmark names, location names, school names, AOIs, image fingerprints, etc.

Method 300 includes querying a geo cell database with the search terms (304). For example, geo determination module 104 can query geo cell database 111 with search terms 232. Method 300 includes receiving a list of geo cells that correspond to the search terms (305). For example, geo cell database 111 can identify one or more geo cells that include information corresponding to search terms 232. Corresponding information can include any of streets, businesses, AOIs, etc. For example, if search terms 232 include a street name and a business name, geo cell database 111 can identify geo cell entries including the street name and the business name.

Geo cell database 111 can include any corresponding geo cells in geo cell subset 238. For example, if geo cell entry 151 includes terms corresponding to search terms 232, geo cell database 111 can include geo cell 152 in geo cell subset 238. Geo cell database 111 can return geo cell subset 238 to listener 212. Listener 212 can receive geo cell subset 238 from geo cell database 111.

In one aspect, a search term correspondence is identified when a search term matches a term in a geo cell entry within a specified margin of error. The specified margin of error can account for some degree of misspellings, additional characters, omitted characters, grammatical errors, etc.

Method 300 includes formulating a geo cell listening area from the list of geo cells (306). For example, listener 212 can form listening area 293 from geo cell subset 238. Listening area 293 can correspond to a geographic area defined by geo cells in geo cell subset 238.

Method 300 includes monitoring an additional normalized signal in the geo cell listening area that satisfies second detection model thresholds that are less stringent than the first detection model thresholds (308). For example, listener 212 can monitor listening area 293 for additional signals related to potential event 233. Listener 212 can monitor signals in normalized signals 122 as well as signals 231 from signal cache 213 (e.g., that were cached within the last 15 minutes). Listener 212 can detect signal(s) 234 in listening area 293 that satisfy detection threshold(s) 292. Detection thresholds 292 can be similar to, but less stringent (e.g., lower) than, detection thresholds 291.

In one aspect, listener 212 detects an additional normalized signal related to potential event 233 based on the characteristics of the normalized signal and detection thresholds 292. Characteristics of a normalized signal can include one or more of: time dimension, location dimension, context dimension, signal type, signal source, or content.

Detection thresholds 292 can define conditions for a normalized signal to be related to a potential event. When characteristics of a normalized signal satisfy detection thresholds 292, listener 212 can consider the normalized signal related to potential event 233. In one aspect, detection thresholds 292 include one or more probability thresholds per event type. Per event type, detection thresholds can be lower (less stringent) than detection thresholds 292. Listener 212 computes a probability of a normalized signal indicating a specified event type from signal characteristics. When the computed probability exceeds a probability threshold in detection thresholds 292 for the specified event type, listener 212 determines the normalized signal is related to potential event 233.

In one aspect, detection thresholds 292 are essentially zero. Thus, listener 212 returns essentially all normalized signals detected in geo cell listening area 293 as signals related to potential event 233.

Listener 212 can send normalized signal(s) 234 to event detection infrastructure 103.

Method 300 validating the potential event as an actual event based on the one or more additional signals (309). For example, event detection infrastructure 103 can validate potential event 233 as event 236 based on normalized signal(s) 234. Event detection infrastructure 103 can send event 236 to event notification 116. Event notification 116 can notify relevant parties of event 236.

In another aspect, event detection infrastructure 103 invalidates potential event 233 based on signal(s) 234.

Event detection infrastructure 103 can also determine that event 236 occurred in geo cell 162. As such, event detection infrastructure 103 can store event 236 in events 167.

Figure 2B:
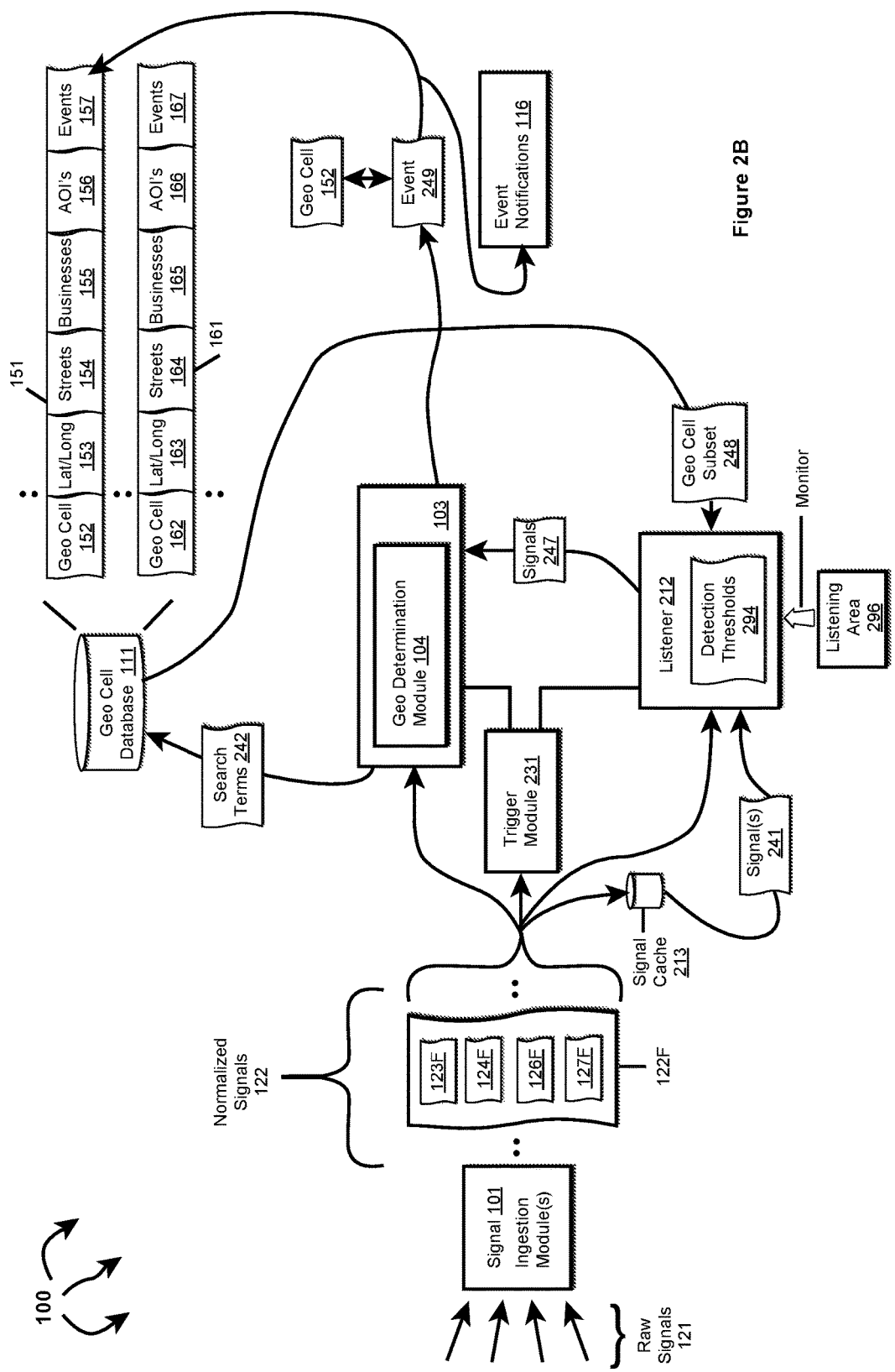
FIG. 2B illustrates an example computer architecture that facilitates detecting an event from signals in a listening area.

FIG. 2B illustrates a further view of computer architecture 100. The components in FIG. 2B can be used to detect an event from signals in a listening area. In FIG. 2B, trigger module 231 monitors normalized signals 122 and triggers formulation of a listening area based of characteristics of normalized signals 122.

Figure 4:
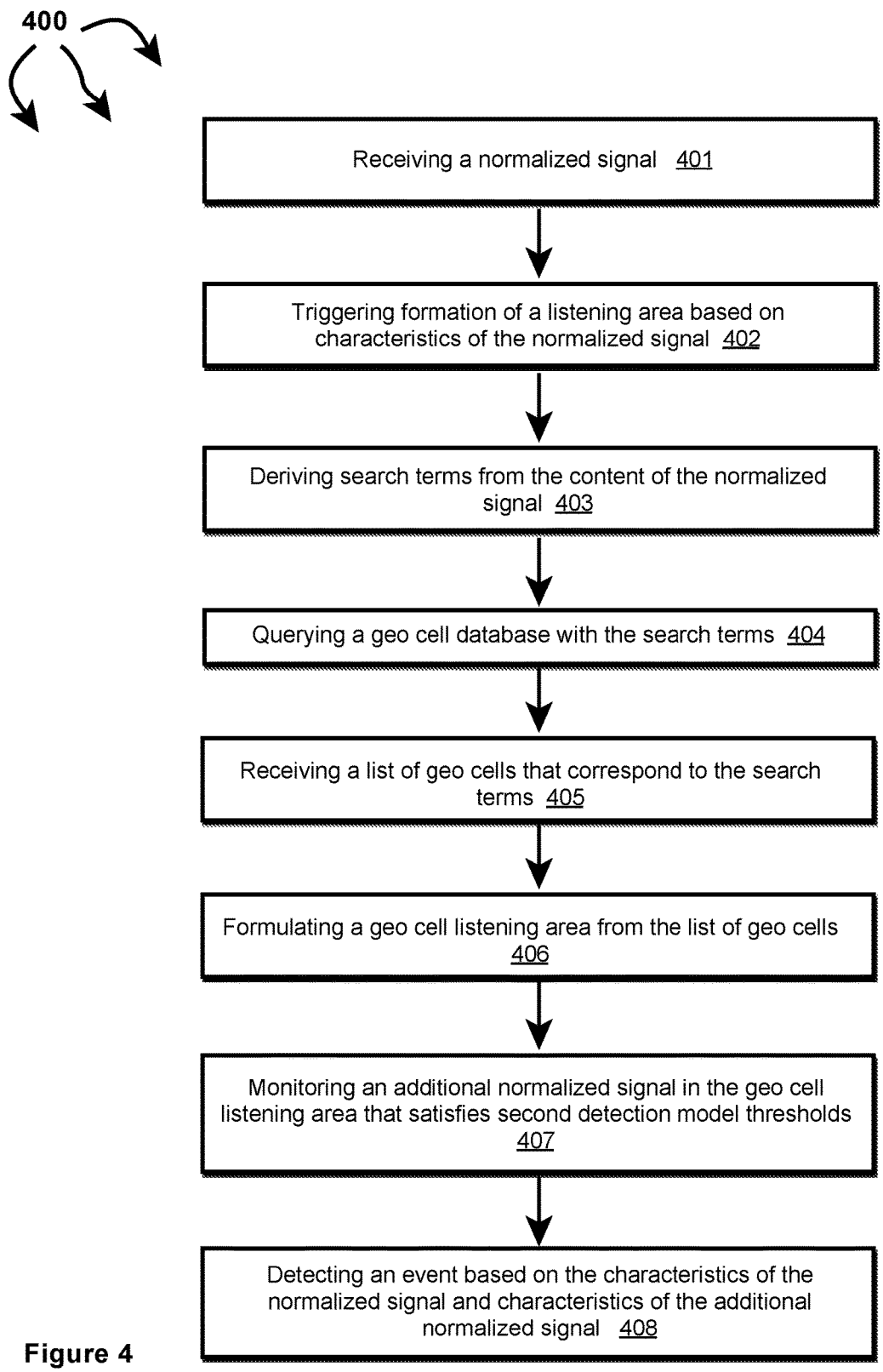
FIG. 4 illustrates a flow chart of an example method for detecting an event from signals in a listening area.

FIG. 4 illustrates a flow chart of an example method 400 for detecting an event from signals in a listening area. Method 400 will be described with respect to the components and data in FIG. 2B. In general, trigger module 231 monitors normalized signals 122 and triggers formulation of a listening area based of characteristics of normalized signals 122.

Method 400 includes receiving a normalized signal (401). For example, signal ingestion modules 101 can send normalized signal 122F to event detection infrastructure 103, trigger module 231, and signal cache 213. Event detection infrastructure 103, trigger module 231, and signal cache 213 can receive normalized signal 122F from signal ingestion modules 101.

Method 400 includes triggering formation of a listening area based on characteristics of the normalized signal (402). For example, trigger module 231 can trigger formation of listening area 296 based on characteristics of normalized signal 122F. Characteristics of normalized signal 122F include time dimension 123F, location dimension 124F, context dimension 126F, content 127F, a signal type, and a signal source. Content 127F can further include audio, image, text, etc.

In one aspect, trigger module 231 utilizes probability modules and detection thresholds similar to event detection infrastructure. The models can be used to compute per event type probabilities based on signal characteristics. Thresholds can define conditions for further investigating the circumstances of a normalized signal. Per event type, computed probabilities can be compared to thresholds. When a probability satisfies (e.g., exceeds) a threshold, trigger module 231 triggers formation of listening area 296 (so that circumstances of normalized signal 122F can be investigated further).

Method 400 includes deriving search terms from content of the normalized signal (403). For example, geo determination module 104 can use one or more of NLP modules 205, audio processing module 206, and image processing module 207 to derive search terms 242 from content 127F. Method 400 includes querying a geo cell database with the search terms (404). For example, geo determination module 104 can query geo cell database 111 with search terms 242. Method 400 includes receiving a list of geo cells that correspond to the search terms (405). For example, geo cell database 111 can identify one or more geo cells that include information corresponding to search terms 242. Geo cell database 111 can include the one or more geo cells in geo cell subset 248. Geo cell database 111 can return geo cell subset 248 to listener 212. Listener 212 can receive geo cell subset 248 from geo cell database 111.

Method 400 includes formulating a geo cell listening area from the list of geo cells (406). For example, listener 212 can formulate listening area 296 from geo cell subset 248. Listening area 296 can correspond to a geographic area defined by geo cells in geo cell subset 248.

Method 400 includes monitoring an additional normalized signal in the geo cell listening area that satisfies detection model thresholds (407). For example, listener 212 can detect normalized signal(s) 247 in listening area 296 that satisfy detection threshold(s) 294. Detection thresholds 294 can be similar to, but less stringent (e.g., lower) than, detection thresholds used by trigger module 231. Listener 212 can monitor listening area 293 for additional signals related to potential event 233. Listener 212 can monitor signals in normalized signals 122 as well as signals 231 from signal cache 213 (e.g., that were cached within the last 15 minutes).

In one aspect, listener 212 detects an additional normalized signal related normalized signal 122F based on the characteristics of the signal and detection thresholds 294. Characteristics of the additional normalized signal can include one or more of: time dimension, location dimension, context dimension, signal type, signal source, or content.

Detection thresholds 294 can define conditions for one normalized signal to be related to another normalized signal. When characteristics of a normalized signal satisfy detection thresholds 292, listener 212 can consider the normalized signal related to normalized signal 122F. In one aspect, detection thresholds 294 include one or more probability thresholds per event type. Per event type, detection thresholds can be lower (less stringent) than detection thresholds used by trigger module 231. Listener 212 computes a probability of a normalized signal indicates a specified event type from signal characteristics. When the computed probability exceeds a probability threshold in detection thresholds 294 for the specified event type, listener 212 determines the normalized signal is related to normalized signal 122F.

In one aspect, detection thresholds 294 are essentially zero. Thus, listener 212 returns essentially all signals detected in geo cell listening area 296 as normalized signals related to normalized signal 122F.

Listener 212 can send normalized signal(s) 243 to event detection infrastructure 103.

Method 400 includes detecting an event based on the characteristics of the normalized signal and characteristics of the additional normalized signal (408). For example, event detection infrastructure 103 can detect event 249 based on characteristics of normalized signal 122F and normalized signals 247. Event detection infrastructure 103 can send event 249 to event notification 116. Event notification 116 can notify relevant parties of event 249. Event detection infrastructure 103 can also determine that event 249 occurred in geo cell 152. As such, event detection infrastructure 103 can store event 249 in events 157.

Figure 2C:
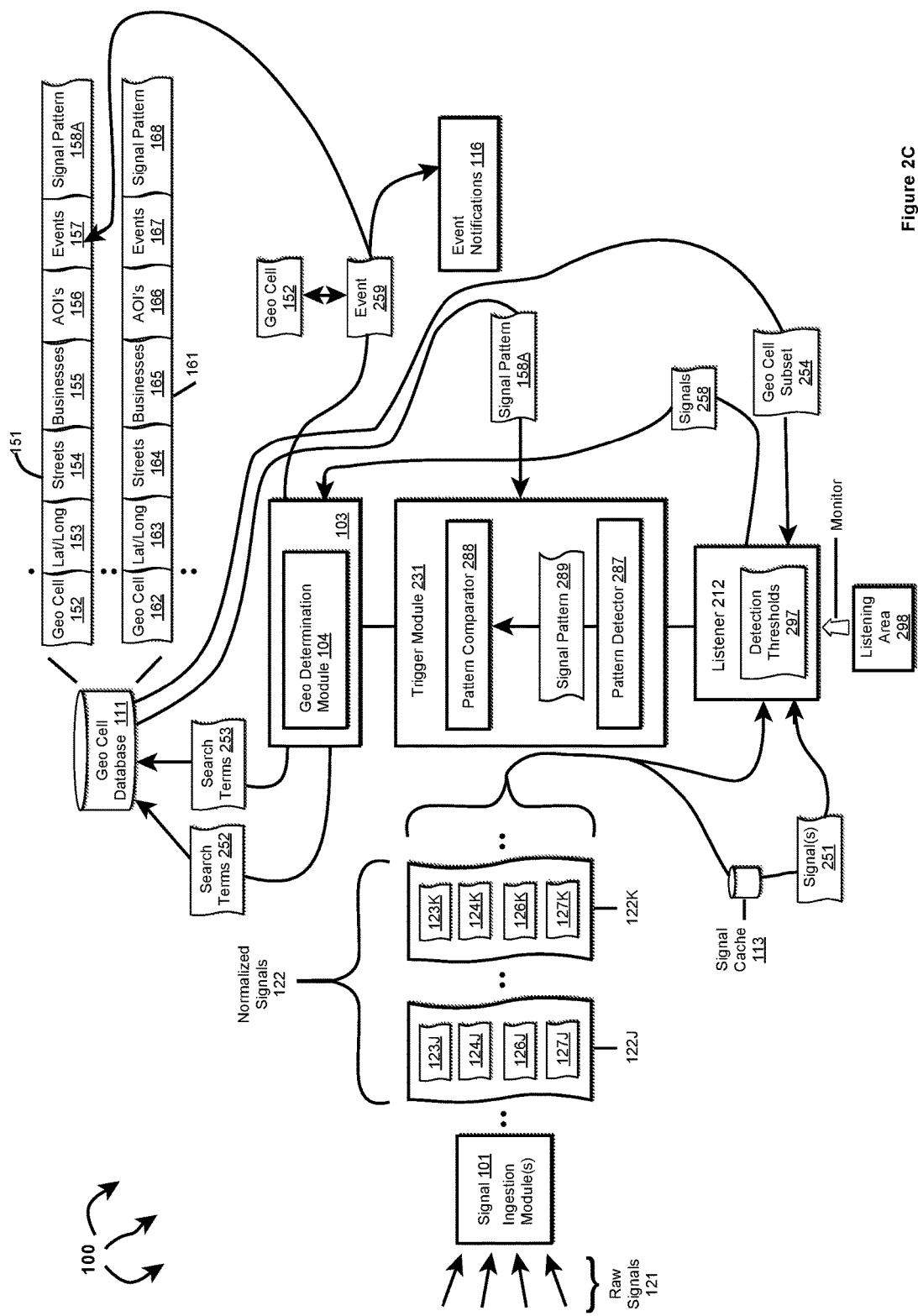
FIG. 2C illustrates an example computer architecture that facilitates detecting an event from signals in a listening area.

FIG. 2C illustrates a further view of computer architecture 100. The components in FIG. 2C can be used to detect an event based on a signal pattern anomaly. In FIG. 2C, trigger module 231 monitors normalized signals 122. For a geo cell context, trigger module 231 can detect patterns in normalized signals for defined periods of time (e.g., every minute, every five minutes, every 30 minutes, etc.). Trigger module 231 can access a "normal" signal pattern for the geo cell context from the geo cell database 111. Trigger module 231 can compare a detected signal pattern to the "normal" signal pattern. When a detected signal pattern differs from a "normal" signal pattern by more than a specified amount, the detected signal pattern can be considered an "anomaly" and possibly indicative of an event in the geo cell. In response to a signal pattern anomaly, trigger module 231 can trigger formation of a listening area.

Figure 2D:
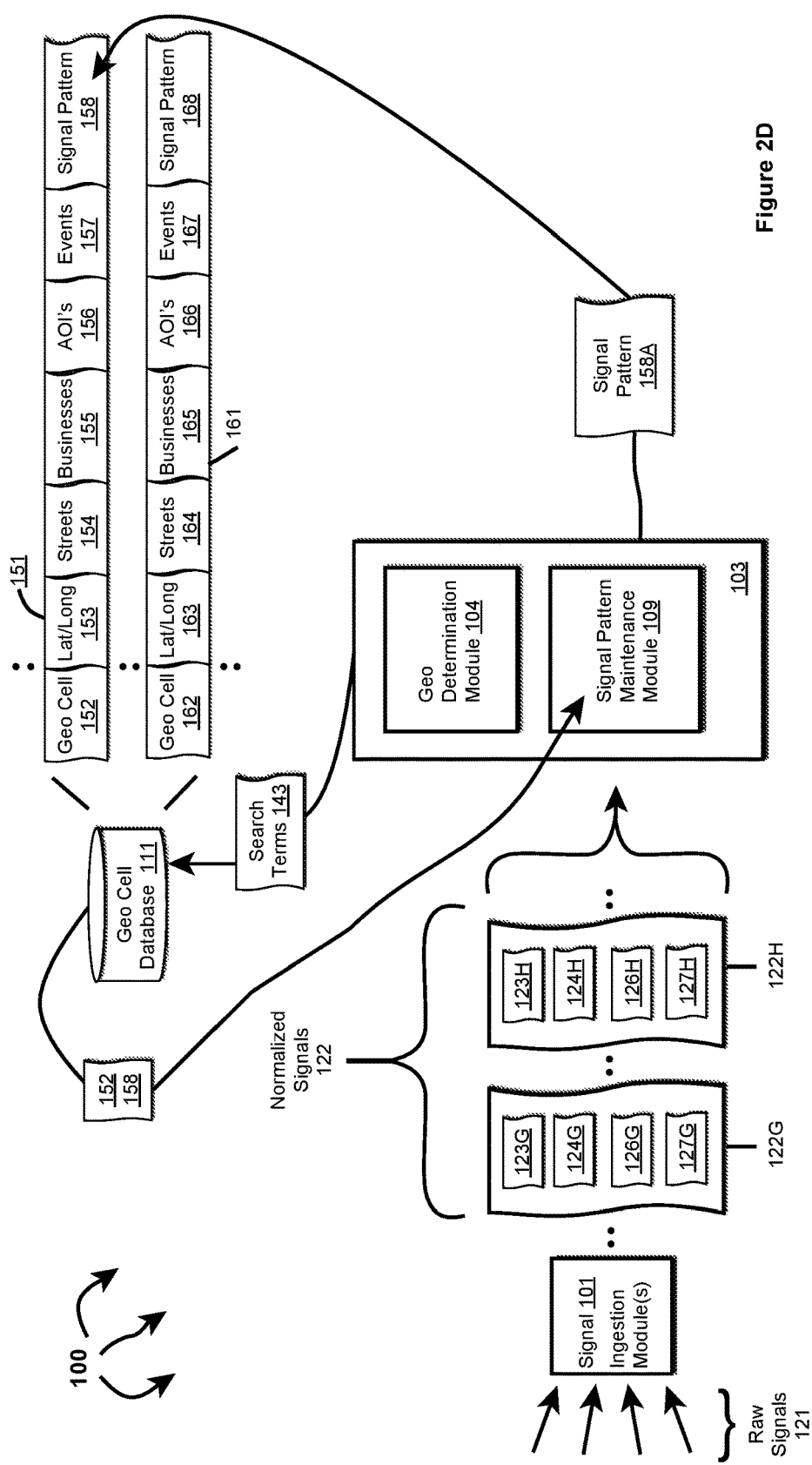
FIG. 2D illustrates an example computer architecture that facilitates maintaining signal patterns.

Turning to FIG. 2D, event detection infrastructure 103 can also include signal pattern maintenance module 109. Signal pattern maintenance module 109 monitors normalized signals per geo cell. Signal pattern maintenance module 109 formulates and maintains one or more signal patterns per geo cell based on characteristics (e.g., signal time dimension, signal location dimension, signal context dimension, signal volume, signal type, signal content, etc.) of normalized signals 122 ingested in a geographic area defined by the geo cell. For example, signal pattern maintenance module 109 can formulate and maintain signal patterns 158 and 168.

Signal patterns can vary per geo cell context, for example, by time of day, time of year, day of week, season, etc. As such, signal pattern maintenance module 109 can formulate and maintain an indication of "normal" signal patterns for a geo cell across a variety of different contexts (e.g., times, days, seasons, etc.). For example, signal pattern maintenance module 109 can formulate and maintain signal pattern 158. Signal pattern 158 can be a "normal" signal pattern for a particular context of geo cell 152. Signal pattern maintenance module 109 can formulate and maintain other signal patterns for other contexts of geo cell 152 in geo cell entry 151. Similarly, signal pattern maintenance module 109 can formulate and maintain signal pattern 168. Signal pattern 168 can be a "normal" signal pattern for a particular context of geo cell 162. Signal pattern maintenance module 109 can formulate and maintain other signal patterns for other contexts of geo cell 162 in geo cell entry 161.

As new normalized signals 122 are monitored, geo determination module 104 can identify a geo cell corresponding to the normalized signals 122. For example, geo determination can determine that normalized signals 122G and 122H correspond to geo cell 152. Geo determination 104 can formulate search terms 143 by using various modules (e.g., NLP module 205, audio processing module 206, image processing module 207, etc.) to process time dimensions 123G and 123H, location dimensions 124G and 124H and context dimensions 126G and 126H. Search terms 143 can include street addresses, building names, landmark names, location names, school names, AOIs, image fingerprints, etc.

Geo determination module 104 can query geo cell database 111 with search terms 143. Geo cell database 111 can identify geo cell 152 as having supplemental information that matches search terms 143. For example, if search terms 143 include a street address and a business name, geo cell database 111 can identify geo cells having the street name and business name in the area defined by the geo cell. Geo cell database 111 can return any identified geo cells and corresponding signal patterns to signal pattern maintenance module 109. For example, geo cell database 111 can return geo cell 152 and signal pattern 158 (a "normal" signal pattern for specified context of geo cell 152) to signal pattern maintenance module 109.

Signal pattern maintenance module 109 can reformulate signal pattern 158 into signal pattern 158A by integrating characteristics of normalized signals 122 into signal pattern 158. Signal pattern maintenance modules can store signal pattern 158A back into geo cell entry 151.

Figure 5:
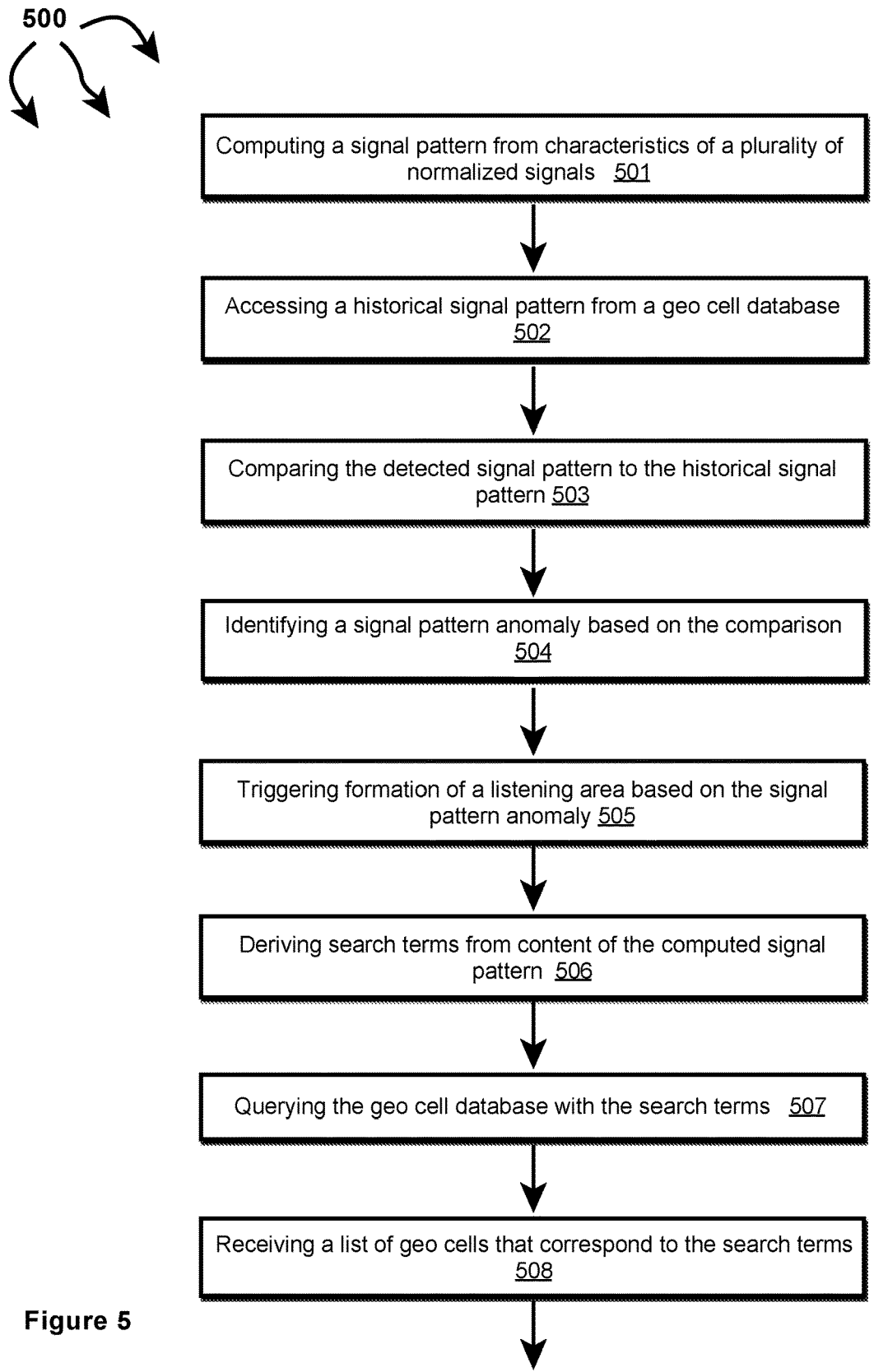
FIG. 5 illustrates a flow chart of an example method for detecting an event from signals in a listening area.
Figure 5:
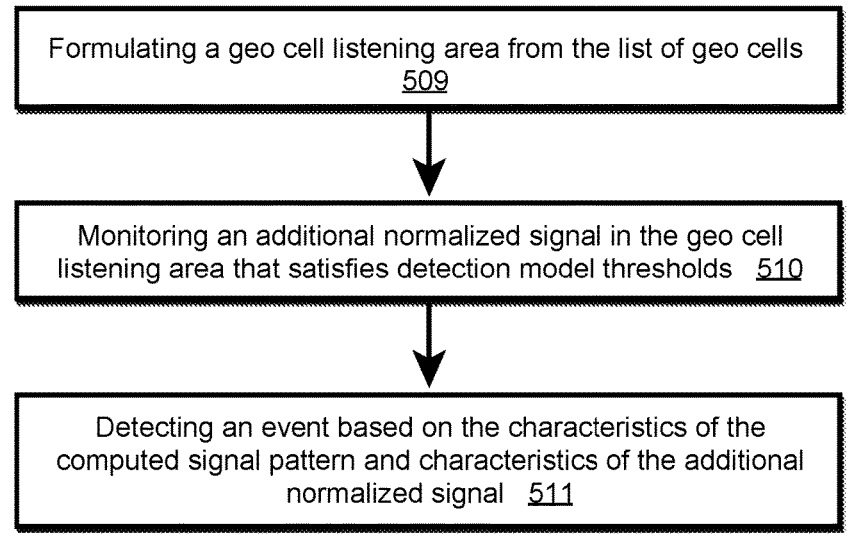

FIG. 5 illustrates a flow chart of an example method 500 for detecting an event from signals in a listening area. Method 500 will be described with respect to the components and data in FIG. 2C. In general, trigger module 231 monitors normalized signals 122, computes signal patterns, and triggers formulation of a listening area based of signal pattern anomalies.

Method 500 includes computing a signal pattern from characteristics of a plurality of normalized signals (501). For example, trigger module 231 can receive normalized signals 122J, 122K, etc. Pattern detector 287 can compute signal pattern 289 from the characteristics of normalized signals 122J, 122K, etc. Normalized signal 122J includes time dimension 123J, location dimension 124J, context dimensions 126J, and content 127J. Similarly, normalized signal 122K includes time dimension 123K, location dimension 124K, context dimensions 126K, and content 127K. In one aspect, pattern detector 287 computes signal pattern 289 from some combination of time dimensions 123J and 123K, location dimensions 124J and 124K, and context dimensions 126J and 126K. Pattern detector 287 can send detected signal pattern 289 to pattern comparator 288.

Method 500 includes accessing a historical signal pattern from a geo cell database (502). For example, trigger module 231 can access signal pattern 158A from geo cell database 111.

More specifically, geo determination module 104 can use one or more of NLP modules 205, audio processing module 206, and image processing module 207 to derive search terms 252 from content in normalized signals 122J, 122K, etc. Search terms 252 can include street addresses, building names, landmark names, location names, school names, AOIs, image fingerprints, etc. Geo determination module 104 can query geo cell database 111 with search terms 252.

Geo cell database 111 can identify geo cell 152 as having supplemental information that matches search terms 252. For example, if search terms 252 include a street address and a business name, geo cell database 111 can identify geo cells having the street name and business name in the area defined by the geo cell. Geo cell database 111 can return any identified geo cells and corresponding signal patterns to signal pattern maintenance module 109. For example, geo cell database 111 can return signal pattern 158A (a "normal" signal pattern for a specified context of geo cell 152) to pattern comparator 288. Pattern comparator 288 can receive signal pattern 158A from geo cell database 111.

Method 500 includes comparing the detected signal pattern to the historical signal pattern (503). For example, pattern comparator 288 can compare detected pattern 289 to signal pattern 158A. Method 500 includes identifying a signal pattern anomaly based on the comparison (504). For example, trigger module 231 can determine that a difference between detected pattern 289 and signal pattern 158A exceeds specified parameters. Based on the determination, trigger module 231 considers detected pattern 189 to be a signal pattern "anomaly" in geo cell 152. Method 500 includes triggering formation of a listening area based on the signal pattern anomaly (505). For example, in response to the detected signal pattern "anomaly" in geo cell 152, trigger module 231 can trigger listening area 298 to listen for other normalized signals related to normalized signals 122J, 122K, etc. and/or related to a potential event.

Method 500 includes deriving search terms from content of the computed signal pattern (506). For example, geo determination module 104 can use one or more of NLP modules 205, audio processing module 206, and image processing module 207 to derive search terms 253 from content in normalized signals 122J, 122K, etc. Search terms 253 can include street addresses, building names, landmark names, location names, school names, AOIs, image fingerprints, etc.

Method 500 includes querying a geo cell database with the search terms (507). For example, geo determination module 104 can query geo cell database 111 with search terms 253.

Method 500 includes receiving a list of geo cells that correspond to the search terms (508). For example, geo cell database 111 can identify one or more geo cells that include information corresponding to search terms 253. If search terms 253 include a street name and an AOI, geo cell database 111 can identify geo cells having the street name and the AOI in the area defined by the geo cell. Further, if search terms 253 indicate an event category, geo cell database 111 can consider prior events (e.g., events 157, 167) when returning matching geo cells. Geo cell database 111 can return any identified geo cells to listener 212 in geo cell subset 144. Geo cell database 111 can include the one or more geo cells in geo cell subset 254. Geo cell database 111 can return geo cell subset 254 to listener 212. Listener 212 can receive geo cell subset 254 from geo cell database 111.

Method 500 includes formulating a geo cell listening area from the list of geo cells (509). For example, listener 212 can formulate listening area 298 from geo cell subset 254. Listening area 298 can correspond to a geographic area defined by geo cells in geo cell subset 258.

Method 500 includes monitoring an additional normalized signal in the geo cell listening area that satisfies detection model thresholds (510). For example, listener 212 can monitor listening area 298 for additional signals related to the detected signal pattern anomaly. Listener 212 can monitor signals in normalized signals 122 as well as signals 251 from signal cache 213 (e.g., that were cached within the last 15 minutes). Listener 212 can detect signal(s) 258 in listening area 298 that satisfy detection threshold(s) 296.

In one aspect, listener 212 detects an additional normalized signal related to the detection signal pattern anomaly based on the characteristics of the normalized signal and detection thresholds 297. Characteristics of a signal can include one or more of: time dimension, location dimension, context dimension, signal type, signal source, or content.

Detection thresholds 297 can define conditions for a normalized signal to be related to a computed signal pattern and/or a detected signal pattern anomaly. When characteristics of a normalized signal satisfy detection thresholds 297, listener 212 can consider the normalized signal related to the computed signal pattern and/or the detected signal pattern anomaly. In one aspect, detection thresholds 297 include one or more probability thresholds per event type. Per event type, detection thresholds can be lower (less stringent) than detection thresholds 297. Listener 212 computes a probability of a normalized signal indicates a specified event type from signal characteristics. When the computed probability exceeds a probability threshold in detection thresholds 297 for the specified event type, listener 212 determines the normalized signal is related to the detected signal pattern anomaly.

In one aspect, detection thresholds 297 are essentially zero. Thus, listener 212 returns essentially all signals detected in geo cell listening area 298 as normalized signals related to the signal pattern anomaly.

Listener 212 can send normalized signal(s) 258 to event detection infrastructure 103.

Method 500 includes detecting an event based on the characteristics of the computed signal pattern and characteristics of the additional normalized signal (511). For example, event detection infrastructure 103 can detect event 259 based on characteristics signal pattern 298 and characteristics of signals 258. Event detection infrastructure 103 can send event 259 to event notification 116. Event notification 116 can notify relevant parties of event 259. Event detection infrastructure 103 can also determine that event 259 occurred in geo cell 152. As such, event detection infrastructure 103 can store event 259 in events 157.

Listening Area Adjustment

In general, the size of a listening area can be adjusted based on signals detected in the listening area. In some aspects, the size of a listening area is expanded. In other aspects, the size of a listening area is compressed.

A listening area can include a number of adjacent areas defined by a corresponding number of geo cells. In one aspect, when normalized signals related to a potential event are detected in a specified number of geo cells within a larger geo cell listening area, the size of the listening area is expanded to include areas defined by additional geo cells. In another aspect, when a specified number of normalized signals related to a potential event are detected in a listening area, the size of the listening area is expanded to include areas defined by additional geo cells.

When a listening area is expanded, the listener listens for additional normalized signals related to a potential event, related to another normalized signal, related to a signal pattern, etc. in the expanded listening area. If a specified number of normalized signals are detected in an expanded listening area and/or if normalized signals are detected in a specified number of geo cells within the expanded area, the listening area can again be expanded. Expansion can continue until specified numbers of normalized signals are no longer detected or a stop condition is satisfied. A stop condition can prevent a listening area from expanding unbounded, for example, when an event is a national or world event that people are posting about in a country or worldwide but did not occur where posts are originating.

Expansion can include uniform expansion from an existing listening area or listening in specified areas defined by one or more adjacent geo cells not previously considered.

Expanding a listening area reduces the likelihood of duplicate event detections, for example, of events covering a larger geographic area.

In another aspect, when a related normalized signal is detected in a listening area, the listening area is compressed (or "zoomed in") to attempt to more precisely determine the geographic location of the related normalized signal.

Any additional normalized signals detected in an expanded listening area can be sent to event detection infrastructure 103. Event detection infrastructure can use the additional normalized signals to validate and/or detect events.

Figure 6A:
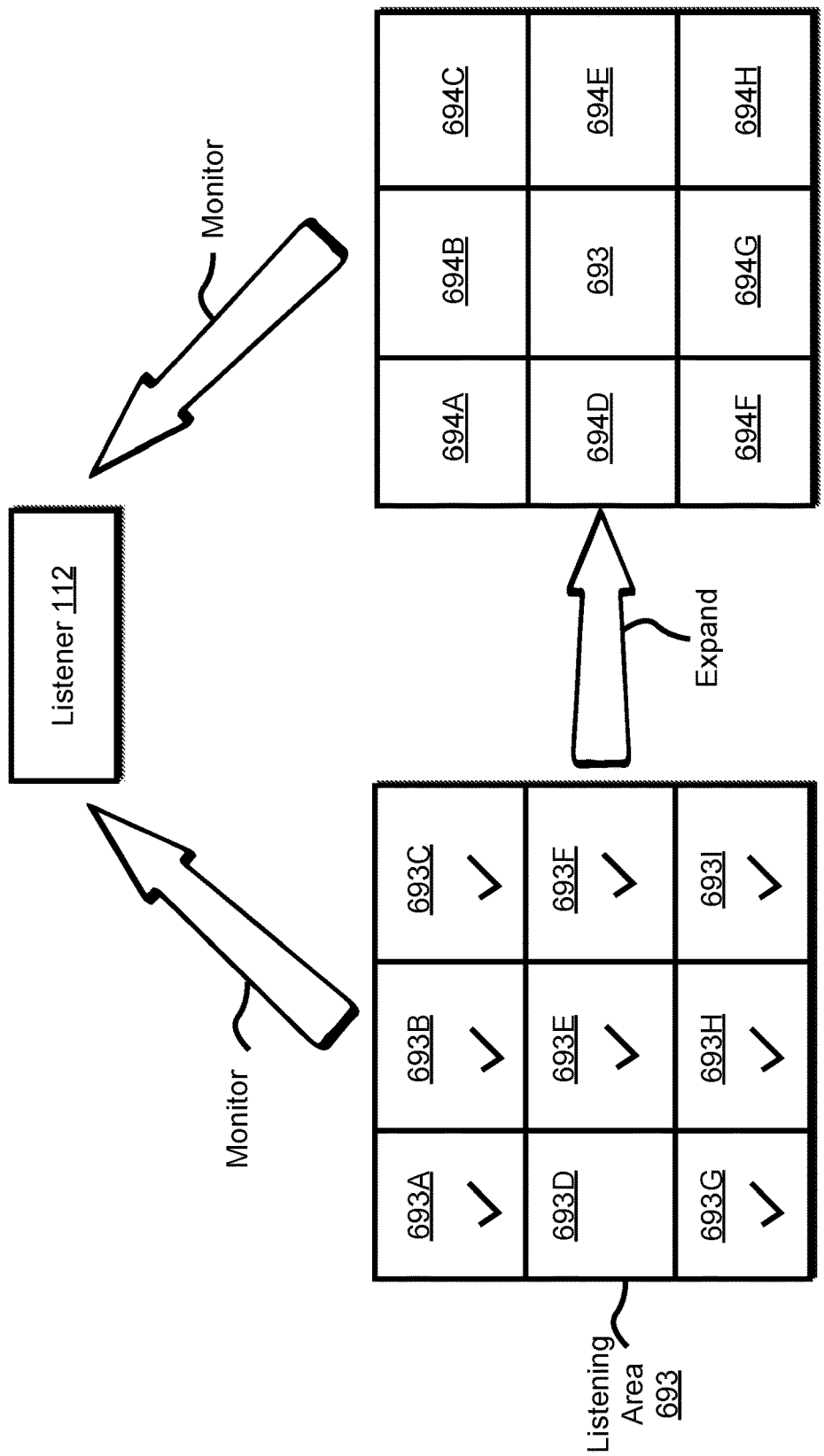
FIG. 6A illustrates an example of expanding a listening area.
Figure 6B:
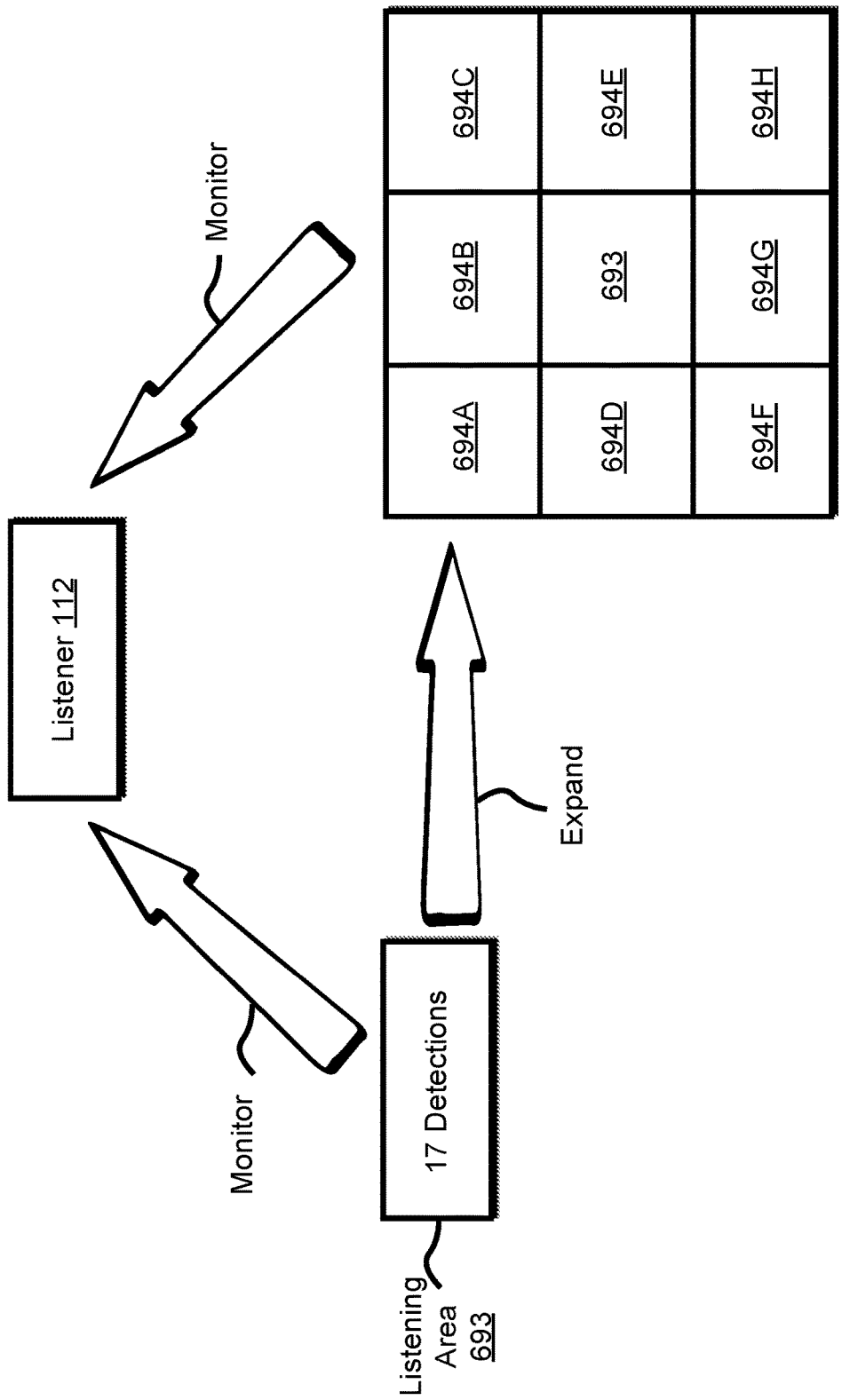
FIG. 6B illustrates an example of expanding a listening area.

Turning to FIGS. 6A and 6B, listener 212 forms listening area 693 from a geo cell subset. Listening area 693 can be formed from one or more geo cells in response to detecting a potential event, based on the characteristics of a normalized signal, in response to detecting a signal pattern anomaly, etc. Listener 212 can monitor listening area 693 for additional normalized signals related to the potential event, the normalized signal, the signal pattern anomaly, etc.

Listening area 693 can correspond to an area defined by a geo cell. In FIG. 6A, listening area 693 can include areas 693A-693I defined by more precise geo cells (and based on the hierarchical nature of geo cells). Listener 212 can monitor additional normalized signals related to a potential event, a normalized signal, a signal pattern anomaly, etc. Listener 212 can also consider historical signals in listening area 693. For example, listener 212 can check signal cache 213 for signals received in the 15 minutes prior to the formation of listening area 693. One or more normalized signals monitored in listening area 693 can satisfy detection thresholds (e.g., 292, 294, or 297).

In one aspect, listener 212 monitors normalized signals in a specified number of sub areas within listening area 693. For example, in FIG. 2A, listener 212 monitors additional normalized signals related to a potential event, another normalized signal, or a signal pattern anomaly in areas 693A, 693B, 693C, 693E, 693F, 693G, and 693H.

In another aspect, listener 212 monitors a specified number of normalized signals in listening area 693. For example, in FIG. 2B, listener 212 monitors 17 additional signals related to a potential event, another normalized signal, or a signal pattern anomaly in listening are 693.

In either case, listening area 693 can be expanded to listening area 694. Listening area 194 includes listening area 693 as well as additional areas 694A-694H defined by other geo cells. Listener 212 can then monitor for additional normalized signals 122 related to a potential event, another normalized signal, or a signal pattern in listening area 694.

Listener 212 can continue listening area expansion until specified numbers of signals are no longer detected or a stop condition is satisfied. A stop condition can prevent a listening area from expanding unbounded, for example, when an event is a national or world event that people are posting about in a country or worldwide but didn't not originate in a listening area.

In another aspect, listener 212 expands a listening area in particular directions (but not necessarily in every direction) based on signal volume and/or signal quantities in the particular directions. Expansion in a direction can continue until related signals are no longer detected or a stop condition is satisfied. Expansion can be used to determine that multiple event detections are in fact detections of the same event. For example, neighbor clusters of signals can be merged.

In another aspect, listener 212 divides a listening area into smaller listening areas and each listening area is monitored. Using smaller listening areas, a geographic location of a signal can be more precisely determined.

Accordingly, once a listening area is formed, a detection threshold in a relatively smaller, but potentially expanding, area at and around a potential event, a normalized signal, or a signal anomaly is lowered. With a lower detection threshold, listener 212 detects more current normalized signals, and possibly also more historical normalized signals, for consideration by event detection infrastructure 103. Detecting more normalized signals provides event detection infrastructure 103 with a more complete view of the geo cell listening area and facilitates event validation (or event rejection).

Geo Cell Database Updates

Geo cell database 111 can be updated at specified time periods (e.g., every 3-6 months) based on different data sources, for example, to address business name changes, construction of new roads and buildings, etc. In one aspect, crowd sourced traffic and road information and/or 3rd party map data is used for updates.

Geo cell database 111 can call into 3rd party APIs to receive data from 3rd parties. Updates can be for specific areas. For example, geo cell database 111 can send a bounding box to a 3rd party API to request data about objects contained within the area defined by one or more geo cells. 3rd parties can provide street maps, visual images (e.g., a street view). Geo cell database 111 can include artificial intelligence that identifies objects of interest from visual images, such as, identifying a street name off of street sign. Geo cell database 111 can scan visual images for new objects within a geographic area defined by a geo cell.

The content of geo cell database 111 can change dynamically based on time of day, day of week, month of year, or season.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A signal ingestion and event detection pipeline aggregate signals and combine detections of various strengths into truthful events. Thus, normalization increases event detection efficiency facilitating event detection closer to "live time" or at "moment zero".

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
receiving a raw signal including source data from a signal source;
applying a transdimensionality transform to the raw signal lowering the dimensionality of the source data and re-encoding the raw signal into a Time, Location, Context (TLC) normalized signal of lower dimensionality, wherein context of the Time, Location, Context (TLC) normalized signal indicates an event type;
determining that characteristics of the Time, Location, Context (TLC) normalized signal satisfy first detection model thresholds;
detecting a potential event and identifying the Time, Location, Context (TLC) normalized signal as a trigger signal;
applying natural language processing (NLP) to text associated with the trigger signal deriving search terms;
querying a geo cell database with the search terms;
receiving a geo cell that corresponds to the search terms;
monitoring a geo cell listening area formed from the geo cell for signals related to the trigger signal;
detecting another Time, Location, Context (TLC) normalized signal in the geo cell listening area as a related signal based at least in part on characteristics of the other Time, Location, Context (TLC) normalized signal satisfying the second detection model thresholds, the other Time, Location, Context (TLC) normalized signal including other normalized data of the lower dimensionality;
obtaining a distance between dimensions of the trigger signal and corresponding dimensions of the related signal; and
validating the potential event as an actual event of the event type based on characteristics of the trigger signal, characteristics of the related signal, and the obtained distance.

2. The method of claim 1, wherein obtaining a distance between dimensions of the trigger signal and corresponding dimensions of the related signal comprise comparing the dimensions of the trigger signal to the corresponding dimensions of the related signal.

3. The method of claim 1, wherein validating the potential event as an actual event comprises validating the potential event as an actual event based on one or more of: a time dimension, a location dimension, or a context dimension included in the other Time, Location, Context (TLC) normalized signal.

4. The method of claim 1, further comprising deriving the text from audio content included in the trigger signal.

5. The method of claim 4, wherein deriving the text comprises applying audio processing to the audio content.

6. The method of claim 1, further comprising deriving the text from image content included in the trigger signal.

7. The method of claim 6, wherein deriving the text comprises applying image processing to the image content.

8. The method of claim 1, further comprising deriving the text by applying natural language processing (NLP) to content of the trigger signal.

9. The method of claim 1, further comprising determining the size of the geo cell listening area based on a location distance threshold associated with the event type.

10. The method of claim 1, further comprising:
expanding the geo cell listening area into an expanded geo cell listening area in response to monitoring the related signal;
detecting a further Time, Location, Context (TLC) normalized signal in the expanded geo cell listening area; and
wherein validating the potential event as an actual event further comprises validating the potential event as the actual event based on characteristics of the further Time, Location, Context (TLC) normalized signal.

11. A system comprising:
a processor;
system memory coupled to the processor and storing instructions configured to cause the processor to:
receive a raw signal including source data from a signal source;
apply a transdimensionality transform to the raw signal lowering the dimensionality of the source data and re-encoding the raw signal into a Time, Location, Context (TLC) normalized signal of lower dimensionality, wherein context of the Time, Location, Context (TLC) normalized signal indicates an event type;
determine that characteristics of the Time, Location, Context (TLC) normalized signal satisfy first detection model thresholds;
detect a potential event and identifying the Time, Location, Context (TLC) normalized signal as a trigger signal;
apply natural language processing (NLP) to text associated with the trigger signal deriving search terms;
query a geo cell database with the search terms;
receive a geo cell that corresponds to the search terms;
monitor a geo cell listening area formed from the geo cell for signals related to the trigger signal;
detect another Time, Location, Context (TLC) normalized signal in the geo cell listening area as a related signal based at least in part on characteristics of the other Time, Location, Context (TLC) normalized signal satisfying the second detection model thresholds, the other Time, Location, Context (TLC) normalized signal including other normalized data of the lower dimensionality;
obtain a distance between dimensions of the trigger signal and corresponding dimensions of the related signal; and
validate the potential event as an actual event of the event type based on characteristics of the trigger signal, characteristics of the related signal, and the obtained distance.

12. The system of claim 11, wherein instructions configured to obtain a distance between dimensions of the trigger signal and corresponding dimensions of the related signal comprise instructions configured to compare the dimensions of the trigger signal to the corresponding dimensions of the related signal.

13. The system of claim 11, wherein instructions configured to validate the potential event as an actual event comprise instructions configured to validate the potential event as an actual event based on one or more of: a time dimension, a location dimension, or a context dimension included in the other Time, Location, Context (TLC) normalized signal.

14. The system of claim 11, further comprising instructions configured to derive the text from audio content included in the trigger signal.

15. The system of claim 14, wherein instructions configured to derive the text comprise instructions configured to apply audio processing to the audio content.

16. The system of claim 11, further comprising instructions configured to derive the text from image content included in the trigger signal.

17. The system of claim 16, wherein instructions configured to derive the text comprise instructions configured to apply image processing to the image content.

18. The system of claim 11, further comprising instructions configured to derive the text by applying natural language processing (NLP) to content of the trigger signal.

19. The system of claim 11, further comprising instructions configured to determining the size of the geo cell listening area based on a location distance threshold associated with the event type.

20. The system of claim 11, further comprising instructions configured to:
- expand the geo cell listening area into an expanded geo cell listening area in response to monitoring the related signal;
- detect a further Time, Location, Context (TLC) normalized signal in the expanded geo cell listening area; and
- wherein instructions configured to validate the potential event as an actual event comprise instructions configured to validate the potential event as the actual event based on characteristics of the further Time, Location, Context (TLC) normalized signal.

* * * * *